United States Patent
Eckl et al.

(10) Patent No.: US 11,111,854 B2
(45) Date of Patent: Sep. 7, 2021

(54) TURBOCHARGER HAVING A MERIDIONALLY DIVIDED TURBINE HOUSING AND A VARIABLE TURBINE NOZZLE

(71) Applicant: Honeywell International Inc., Morris Plains, NJ (US)

(72) Inventors: Filip Eckl, Dolni Kounice (CZ); Petr Pribyl, Zdar nad Sazavou (CZ); Petr Skara, Prague (CZ); Pavel Foucek, Brno (CZ)

(73) Assignee: Garrett Transportation 1 Inc., Torrance, CA (US)

( * ) Notice: Subject to any disclaimer, the term of this patent is extended or adjusted under 35 U.S.C. 154(b) by 755 days.

(21) Appl. No.: 15/590,211

(22) Filed: May 9, 2017

(65) Prior Publication Data

US 2018/0328280 A1  Nov. 15, 2018

(51) Int. Cl.
| | |
|---|---|
| *F02C 6/12* | (2006.01) |
| *F01D 5/14* | (2006.01) |
| *F02B 37/24* | (2006.01) |
| *F01D 17/16* | (2006.01) |
| *F01D 9/04* | (2006.01) |

(Continued)

(52) U.S. Cl.
CPC .............. *F02C 6/12* (2013.01); *F01D 5/146* (2013.01); *F01D 9/02* (2013.01); *F01D 9/041* (2013.01); *F01D 17/165* (2013.01); *F01D 17/167* (2013.01); *F02B 37/025* (2013.01);
(Continued)

(58) Field of Classification Search
CPC ... F02C 6/12; F01D 5/146; F01D 9/02; F01D 9/026; F01D 9/041; F01D 17/16; F01D 17/165; F01D 17/167; F02B 37/025; F02B 37/22; F02B 37/24; F02B 39/00;
(Continued)

(56) References Cited

U.S. PATENT DOCUMENTS

| | | |
|---|---|---|
| 4,027,994 A | 6/1977 | MacInnes |
| 5,092,126 A | 3/1992 | Yano |

(Continued)

FOREIGN PATENT DOCUMENTS

JP   2012219640 A   11/2012

OTHER PUBLICATIONS

EPO extended search report for EP Appl. No. 18170710.0-1006 dated Aug. 22, 2018.

*Primary Examiner* — Michael Lebentritt
*Assistant Examiner* — Jason G Davis
(74) *Attorney, Agent, or Firm* — John C. James

(57) ABSTRACT

A turbocharger has a meridionally divided turbine housing defining a first scroll and a first nozzle, and a second scroll and a second nozzle. The first and second nozzles are divided from each other by a shroud plate mounted within the nozzle, for isolating the exhaust gas streams flowing through the two nozzles from each other. A plurality of first vanes are disposed in the first nozzle, and plurality of second vanes are disposed in the second nozzle. A nozzle ring rotatably supports a plurality of vane shafts that extend across the first and second nozzles, passing through openings in the shroud plate. A first vane and a second vane are affixed to each vane shaft. Rotation of the vane shafts causes the first vanes and the second vanes to pivot for regulating the two streams of exhaust gas flowing through the first and second nozzles.

11 Claims, 7 Drawing Sheets

(51) Int. Cl.
*F02B 37/02* (2006.01)
*F01D 9/02* (2006.01)
*F02B 39/00* (2006.01)

(52) U.S. Cl.
CPC .............. *F02B 37/24* (2013.01); *F02B 39/00* (2013.01); *F01D 9/026* (2013.01); *F05D 2220/40* (2013.01)

(58) Field of Classification Search
CPC .... F05D 2220/40; F04D 29/44; F04D 29/444; F04D 29/46; F04D 29/462
See application file for complete search history.

(56) References Cited

U.S. PATENT DOCUMENTS

| | | |
|---|---|---|
| 6,260,358 B1 | 7/2001 | Daudel et al. |
| 7,121,788 B2 * | 10/2006 | Daudel ................. F01D 17/165 415/159 |
| 7,513,114 B2 * | 4/2009 | Sumser ................. F02B 37/02 415/151 |
| 7,828,517 B2 | 11/2010 | Serres |
| 8,128,356 B2 * | 3/2012 | Higashimori ......... F01D 17/148 415/205 |
| 8,590,305 B2 | 11/2013 | Anschel et al. |
| 2007/0180826 A1 | 8/2007 | Sumser et al. |
| 2009/0290980 A1 | 11/2009 | Higashimori |
| 2011/0194929 A1 | 8/2011 | Denholm et al. |
| 2015/0013332 A1 | 1/2015 | Nasir et al. |

\* cited by examiner

TURBOCHARGER HAVING A MERIDIONALLY DIVIDED TURBINE HOUSING AND A VARIABLE TURBINE NOZZLE

BACKGROUND OF THE INVENTION

The present disclosure relates to turbochargers in which a turbine of the turbocharger is driven by exhaust gas from a reciprocating engine. The invention relates more particularly to turbine housings that are divided into a plurality of substantially separate sections each fed by a separate exhaust system.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

In multiple-piston reciprocating engines, it is known to design the exhaust system in such a manner as to take advantage of the pressure pulsation that occurs in the exhaust stream. In particular, it is known to employ what is known as "pulse separation" wherein the cylinders of the engine are divided into a plurality of subgroups, and the pulses from each subgroup of cylinders are substantially isolated from those of the other subgroups by having independent exhaust passages for each subgroup. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. Thus, the turbine housing into which the exhaust gases are fed is typically divided into a plurality of substantially separate parts.

There are two basic ways in which turbine housings have been divided: (1) meridional division, and (2) sector division. In a meridionally divided turbine housing, the scroll or chamber that surrounds the turbine wheel and into which the exhaust gases are fed is divided into a plurality of passages in the meridional plane such that each passage occupies substantially a full circumference and the passages succeed each other in the axial direction, such as shown in FIG. 4 of U.S. Pat. No. 4,027,994.

In a sector-divided turbine housing, the generally annular chamber is divided into angular sectors each of which occupies only a part of the circumference such that the passages succeed each other in the circumferential direction, such as shown in FIG. 2 of U.S. Pat. No. 6,260,358. The '358 patent also discloses fixed guide vanes that are positioned just radially inwardly of the chamber and guide the flow into the turbine wheel.

The present disclosure relates to turbochargers having a meridionally divided turbine housing. The present disclosure also relates to turbochargers having a variable turbine nozzle.

SUMMARY OF THE DISCLOSURE

The present disclosure describes embodiments of turbochargers having a variable-nozzle turbine and also having a meridionally divided turbine housing. In accordance with an embodiment of the invention, a turbocharger includes:

- a turbine comprising a turbine housing and a turbine wheel mounted in the turbine housing and connected to a rotatable shaft for rotation therewith, the turbine housing defining a meridionally divided scroll extending circumferentially and surrounding the turbine wheel, the meridionally divided scroll defining a first scroll extending substantially fully about the turbine wheel and a separate second scroll extending substantially fully about the turbine wheel;
- the turbine housing defining a separate inlet for each of the first and second scrolls through which separate first and second exhaust gas streams are received;
- a nozzle leading from the meridionally divided scroll generally radially inwardly to the turbine wheel;
- a compressor comprising a compressor housing and a compressor wheel mounted in the compressor housing and connected to the rotatable shaft for rotation therewith;
- a center housing connected between the compressor housing and the turbine housing and containing bearings for the shaft;
- a generally annular nozzle ring having a first face comprising one wall of the nozzle and axially spaced from an opposite wall of the nozzle;
- a shroud plate mounted within the nozzle, the shroud plate meridionally dividing the nozzle into a first nozzle and a second nozzle, the first nozzle receiving the first exhaust gas stream from the first scroll, the second nozzle receiving the second exhaust gas stream from the second scroll; and
- a plurality of circumferentially spaced first vanes disposed in the first nozzle and a plurality of circumferentially spaced second vanes disposed in the second nozzle, the first and second vanes being rotatably mounted to the nozzle ring so as to be variable in setting angle for regulating exhaust gas flow to the turbine wheel.

In one embodiment, the meridionally divided scroll of the turbine housing defines a divider wall that provides separation between the first exhaust gas stream in the first scroll from the second exhaust gas stream in the second scroll. A radially innermost edge of the divider wall is proximate a radially outer edge of the shroud plate, such that the shroud plate continues the separation between the first and second exhaust gas streams through the nozzle.

In accordance with one embodiment, the nozzle ring defines a plurality of circumferentially spaced bearing holes, and the variable nozzle includes a plurality of vane shafts respectively disposed in the bearing holes and rotatable within the bearing holes about respective axes of the vane shafts. Each vane shaft has a first shaft portion affixed to one of the first vanes in the first nozzle and has a second shaft portion extending through an opening in the shroud plate and affixed to one of the second vanes in the second nozzle.

Thus, rotation of the vane shafts about the respective axes thereof causes the first vanes to pivot within the first nozzle and causes the second vanes to pivot within the second nozzle. Accordingly, a single actuator can be employed for pivoting both sets of vanes in simultaneous/synchronous fashion.

The second shaft portions of the vane shafts optionally can project axially beyond the second vanes and extend into blind shaft receptacles defined in the opposite wall of the nozzle. In this manner, the vanes shafts can be supported at both ends. In one embodiment, the blind shaft receptacles are defined in an annular insert that is formed separately from the turbine housing and is disposed in an annular recess defined in the turbine housing.

A plurality of first spacers can be disposed between the nozzle ring and the shroud plate to govern a first axial spacing between the first face of the nozzle ring and the shroud plate, and a plurality of second spacers can be disposed between the shroud plate and the opposite wall of the nozzle to govern a second axial spacing between the shroud plate and the opposite wall of the nozzle.

In one embodiment, each of the first spacers includes a pin of smaller diameter than the first spacer, the pin having a first portion that projects axially from one side of the first spacer toward the nozzle ring, and the nozzle ring defines a plurality of first receiving holes that respectively receive the first portions of the pins of the first spacers.

Each pin can also include a second portion that projects axially from an opposite side of the first spacer toward the opposite wall of the nozzle, the second portions of the pins passing through pin-receiving holes in the shroud plate, and the opposite wall of the nozzle can define a plurality of second receiving holes that respectively receive ends of the second portions of the pins of the first spacers.

In one embodiment, the second spacers comprise sleeves of greater diameter than the pins of the first spacers, each sleeve defining a central bore through which a respective one of the pins of the first spacers passes.

The opposite wall of the nozzle can be defined by an annular insert and the turbine housing can define an annular recess in which the annular insert is disposed. The annular insert can define the second receiving holes for the pins.

In one embodiment, the second receiving holes pass entirely through an axial thickness of the annular insert and the turbine housing defines a plurality of blind holes that align with the second receiving holes and that receive terminal ends of the second portions of the pins.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
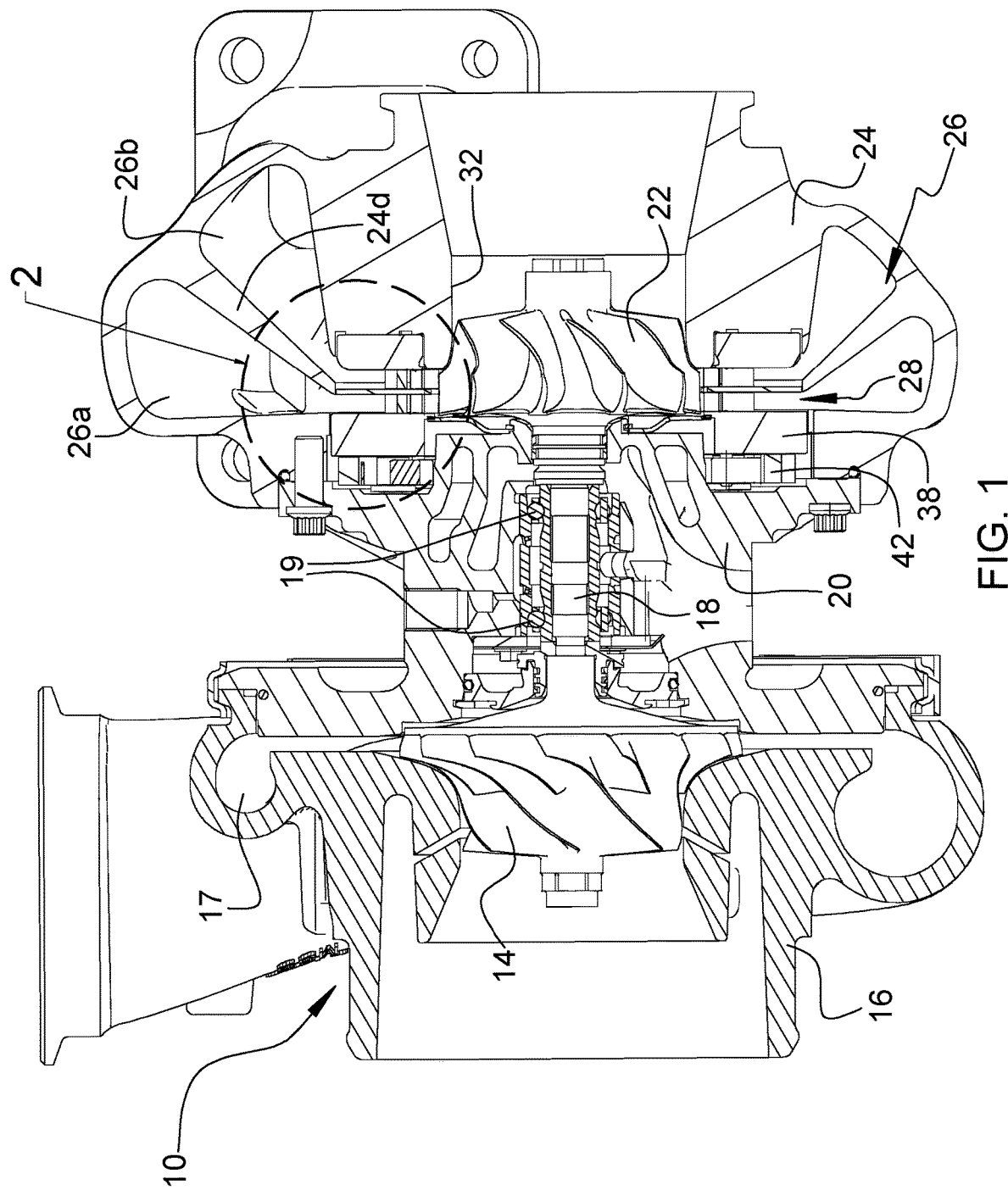
FIG. 1 is an axial cross-sectional view of a turbocharger in accordance with one embodiment of the present invention.

The present invention pertains to turbochargers that include a variable-nozzle turbine (VNT), wherein the variable nozzle comprises an array of pivotable vanes whose setting angles can be varied for regulating flow of exhaust gas into the turbine wheel. FIG. 1 illustrates a VNT turbocharger 10 in accordance with one embodiment of the invention. The turbocharger includes a compressor wheel or impeller 14 disposed in a compressor housing 16 and mounted on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to a volute 17, which collects the compressed air for supply to the intake of an internal combustion engine (not shown) for boosting the performance of the engine.

The turbocharger also includes a turbine housing 24 that houses the turbine wheel 22. As previously noted, in reciprocating internal combustion engines having a plurality of cylinders, it is advantageous to design the exhaust system in such a manner as to take advantage of the pressure pulsation that occurs in the exhaust streams discharged from the cylinders. In particular, it is advantageous to employ what is known as "pulse separation" wherein the cylinders of the engine are divided into a plurality of subgroups, and the pulses from each subgroup of cylinders are substantially isolated from those of the other subgroups by having independent exhaust passages for each subgroup. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. The turbine housing 24 in accordance with the present embodiment of the invention therefore defines a meridionally divided scroll 26 that surrounds the turbine wheel and that receives exhaust gas from the internal combustion engine for driving the turbine wheel. In particular, the turbine housing defines the scroll as two completely separate first and second scrolls 26a and 26b, respectively, each of which extends substantially 360 degrees about the turbine wheel 22. The turbine housing includes a divider wall 24d that divides the scroll into the two separate scrolls. The turbine housing also includes two separate exhaust gas inlets to the meridionally divided scroll, one inlet directing a first exhaust gas stream from a first bank of internal combustion engine cylinders (not shown) into the first scroll 26a, and the other inlet directing a second exhaust gas stream from a second bank of cylinders (not shown) into the second scroll 26b. The two separate exhaust gas streams are directed from their respective scrolls 26a and 26b generally radially inwardly through a turbine nozzle 28 to the turbine wheel 22. As the exhaust gas flows through the passages between the blades of the turbine wheel, the gas is expanded to a lower pressure, and the gas discharged from the wheel exits the turbine housing through a generally axial bore 32 therein.

In accordance with the present embodiment of the invention, the turbine nozzle 28 is a variable nozzle for varying the cross-sectional flow area and flow direction through the nozzle so as to regulate flow into the turbine wheel. The variable nozzle in accordance with the present invention advantageously preserves the separation between the two exhaust gas streams substantially all the way until the exhaust gas streams impinge on the turbine wheel 22.

Figure 2:
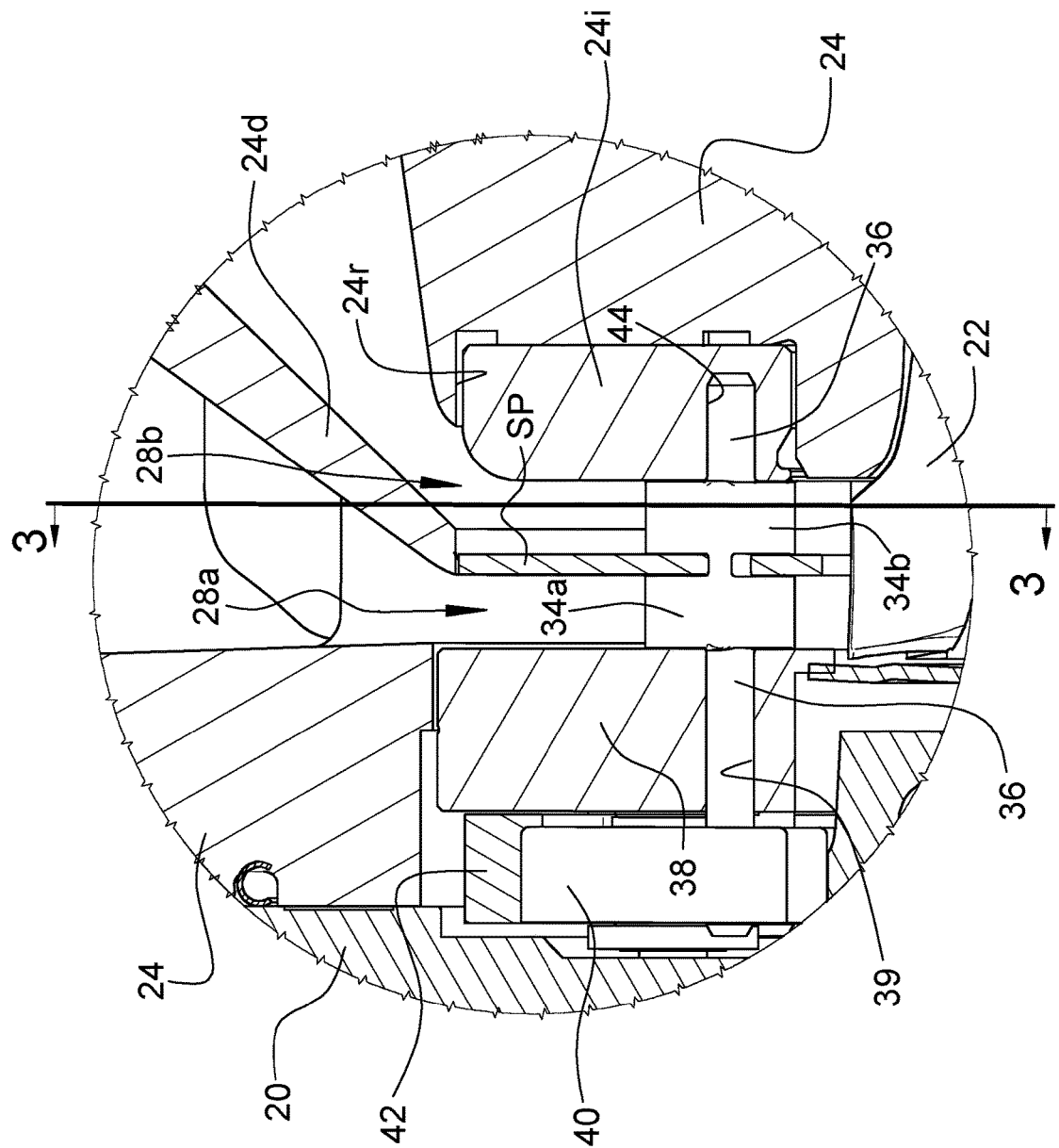
FIG. 2 is a portion of FIG. 1, magnified to illustrate a variable nozzle of the turbocharger.

Referring now to FIG. 2, this separation of exhaust streams in the nozzle 28 is accomplished by the provision of a shroud plate SP comprising an annular plate that is disposed within the turbine nozzle 28, with a central axis of the shroud plate being coaxial with the rotation axis of the turbine wheel 22. In accordance with the illustrated embodiment of the invention, the variable nozzle 28 is defined between an annular nozzle ring 38 mounted within the turbine housing 24 and an opposite wall formed by an annular insert 24i that is disposed in an annular recess 24r defined in the turbine housing. The shroud plate SP divides the turbine nozzle into a first nozzle 28a and a second nozzle 28b. The first nozzle 28a receives the first exhaust gas stream from the first scroll 26a and directs the gas into the turbine wheel; similarly, the second nozzle 28b receives the second exhaust gas stream from the second scroll 26b and directs the gas into the turbine wheel. The radially outer periphery of the shroud plate SP is as close as practicable to the radially inner edge of the scroll dividing wall 24d. The radially inner periphery of the shroud plate is as close as practicable to the turbine wheel 22, so as to maintain the separation between the two exhaust gas streams substantially all the way to the turbine wheel.

The variable nozzle includes a plurality of first vanes 34a that are located adjacent a first face of the nozzle ring 38 and are circumferentially spaced about the first nozzle 28a. The variable nozzle further includes a plurality of second vanes 34b that are circumferentially spaced about the second nozzle 28b. Each first vane 34a is affixed to a first portion of a vane shaft 36 that passes through a bearing hole 39 in the generally annular nozzle ring 38. Each vane shaft 36 is rotatable in its bearing hole about its axis for rotating the attached vane. The first portion of each of the vane shafts 36 has a vane arm 40 affixed to an end of the vane shaft that protrudes out from the second face of the nozzle ring 38, and is engaged by a generally annular unison ring 42 (also referred to as an actuator ring) that is rotatable about its axis and that is coaxial with the nozzle ring 38. An actuator (not shown) is connected to the unison ring 42 for rotating it about its axis. When the unison ring is rotated, the vane arms 40 are rotated to cause the vane shafts 36 to rotate about their axes, thereby rotating the first vanes 34a so as to vary the cross-sectional flow area and flow direction through the first nozzle 28a.

As shown in FIG. 2, the second nozzle 28b includes second vanes 34b. In the illustrated embodiment, each vane shaft 36 has a second shaft portion that extends through an opening in the shroud plate SP and is affixed to one of the second vanes 34b in the second nozzle. Thus, rotation of the vane shafts 36 about the respective axes thereof causes the first vanes 34a to pivot within the first nozzle 28a and causes the second vanes 34b to pivot within the second nozzle 28b in a simultaneous or synchronous fashion. A single actuator (not shown) is able to pivot both sets of vanes.

In the illustrated embodiment of the invention, the second shaft portions of the vane shafts 36 project axially beyond the second vanes 34b and extend into blind shaft receptacles 44 defined in the opposite wall of the nozzle. In this manner, the vane shafts are supported at both ends. As shown, the blind shaft receptacles can be defined in the annular insert 24i that is formed separately from the turbine housing and is disposed in the annular recess 24r defined in the turbine housing. Alternatively, in another embodiment (not shown), the nozzle wall formed by the annular insert 24i can be formed instead by an integral part of the turbine housing 24, in which case the shaft receptacles 44 can be defined in the turbine housing.

Figure 4:
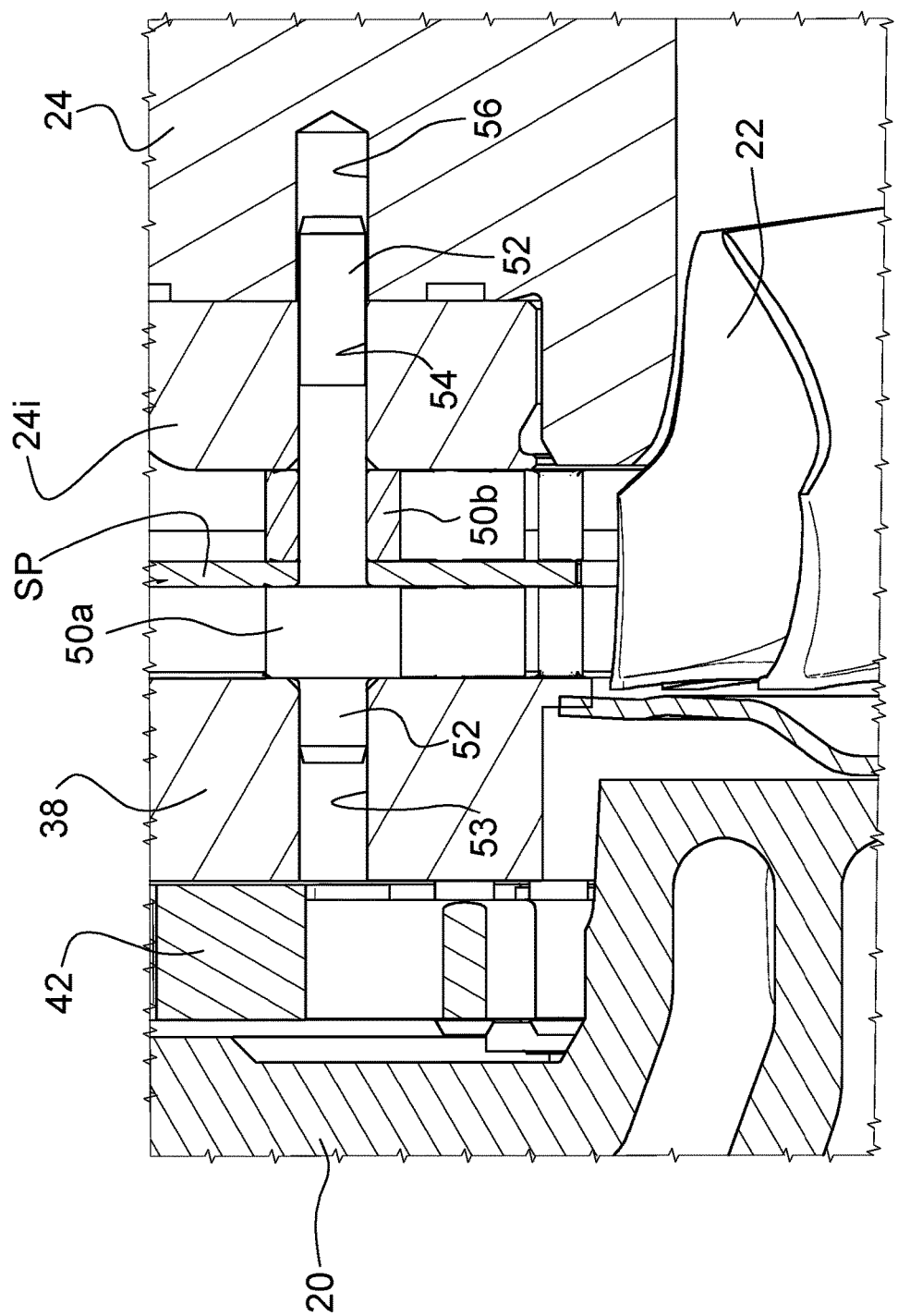
FIG. 4 is a sectioned view along line 4-4 in FIG. 3.
Figure 5:
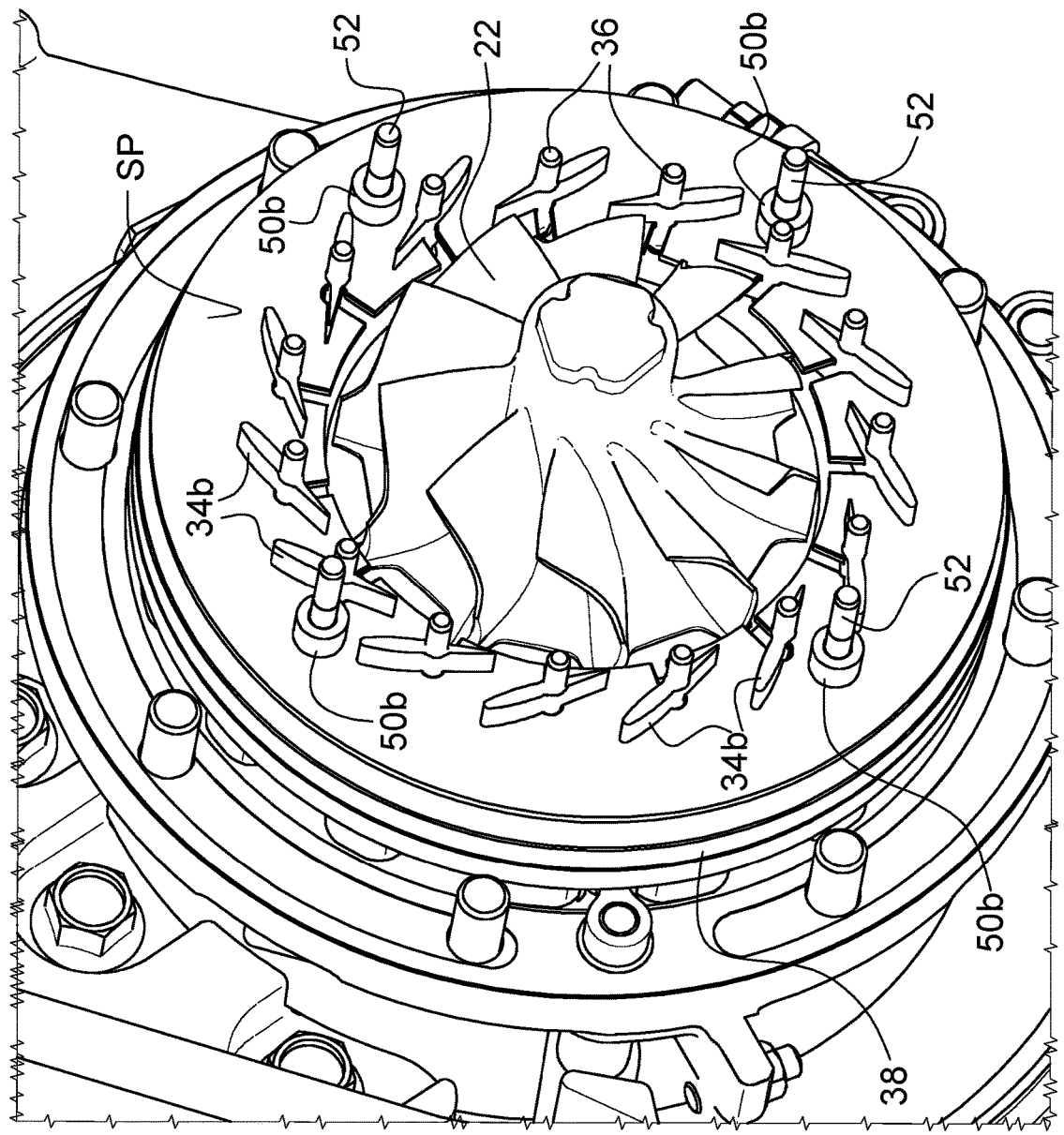
FIG. 5 is an isometric view of the turbine of the turbocharger in FIG. 1, with the turbine housing and its annular insert removed so that the variable nozzle is visible.
Figure 6:
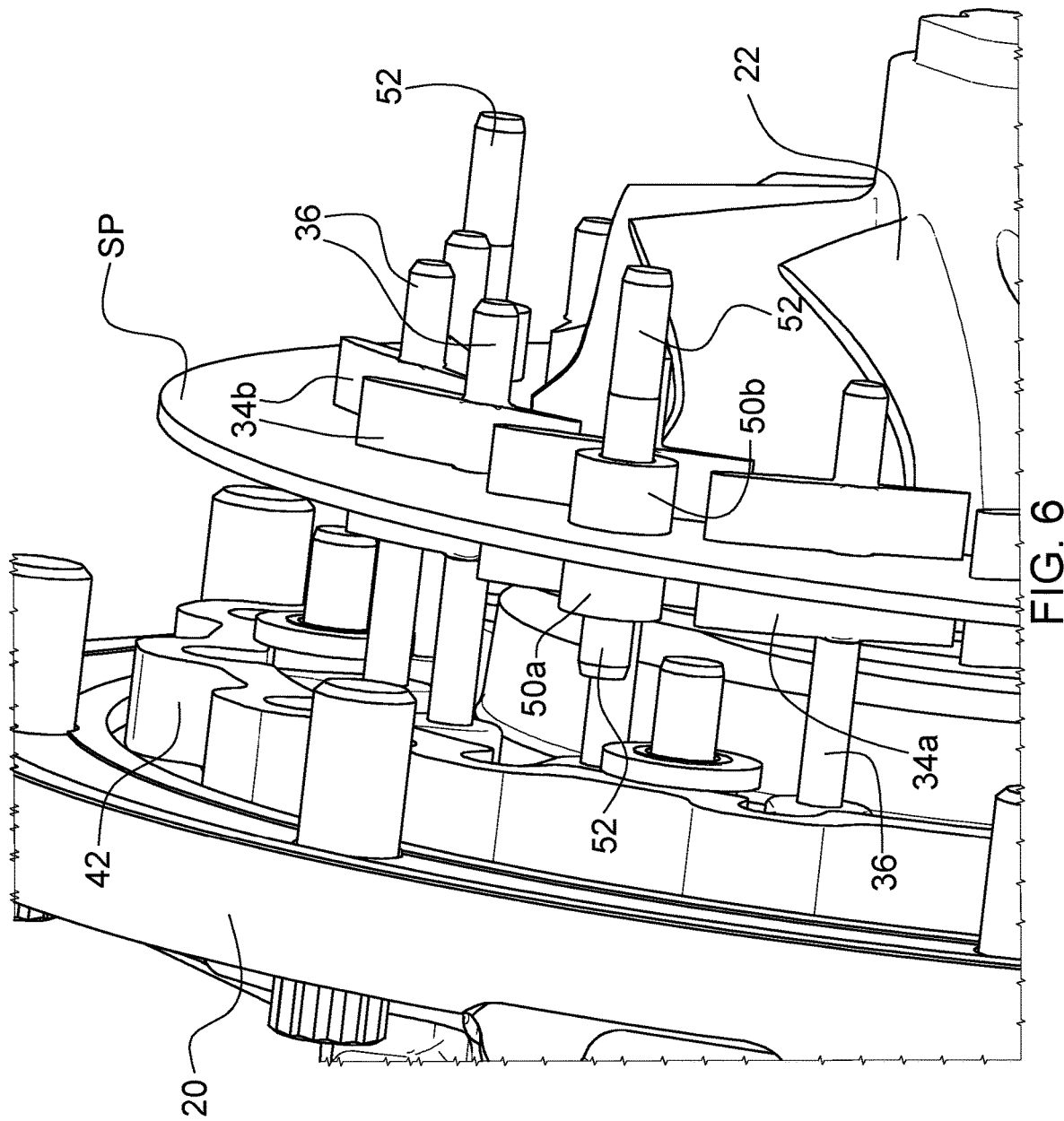
FIG. 6 is an isometric view of the variable nozzle, with the nozzle ring and the annular turbine housing insert removed in order to show details of the variable nozzle.

With reference to FIGS. 4 through 6, the variable nozzle in accordance with the illustrated embodiment of the invention includes a plurality of first spacers 50a disposed between the nozzle ring 38 and the shroud plate SP to govern a first axial spacing between the first face of the nozzle ring and the shroud plate. Each of the first spacers 50a includes a pin 52 of smaller diameter than the first spacer. The pin has a first portion that projects axially from one side of the first spacer toward the nozzle ring 38. The nozzle ring defines a plurality of first receiving holes 53 that respectively receive the first portions of the pins 52 of the first spacers.

The variable nozzle also includes a plurality of second spacers 50b disposed between the shroud plate SP and the opposite wall of the nozzle to govern a second axial spacing between the shroud plate and the opposite wall of the nozzle. In the illustrated embodiment, the opposite wall of the nozzle is formed by the insert 24i. Each pin 52 also includes a second portion that projects axially from an opposite side of the first spacer 50a toward the insert 24i. The second portions of the pins 52 pass through pin-receiving holes in the shroud plate, and the insert 24i defines a plurality of second receiving holes 54 that respectively receive ends of the second portions of the pins of the first spacers. In the illustrated embodiment, the second spacers 50b comprise sleeves of greater diameter than the pins 52 of the first spacers, each sleeve defining a central bore through which a respective one of the pins 52 of the first spacers passes.

In the illustrated embodiment, the second receiving holes 54 pass entirely through an axial thickness of the annular insert 24i and the turbine housing 24 defines a plurality of blind holes 56 that align with the second receiving holes 54 and that receive terminal ends of the second portions of the pins 52.

Figure 3:
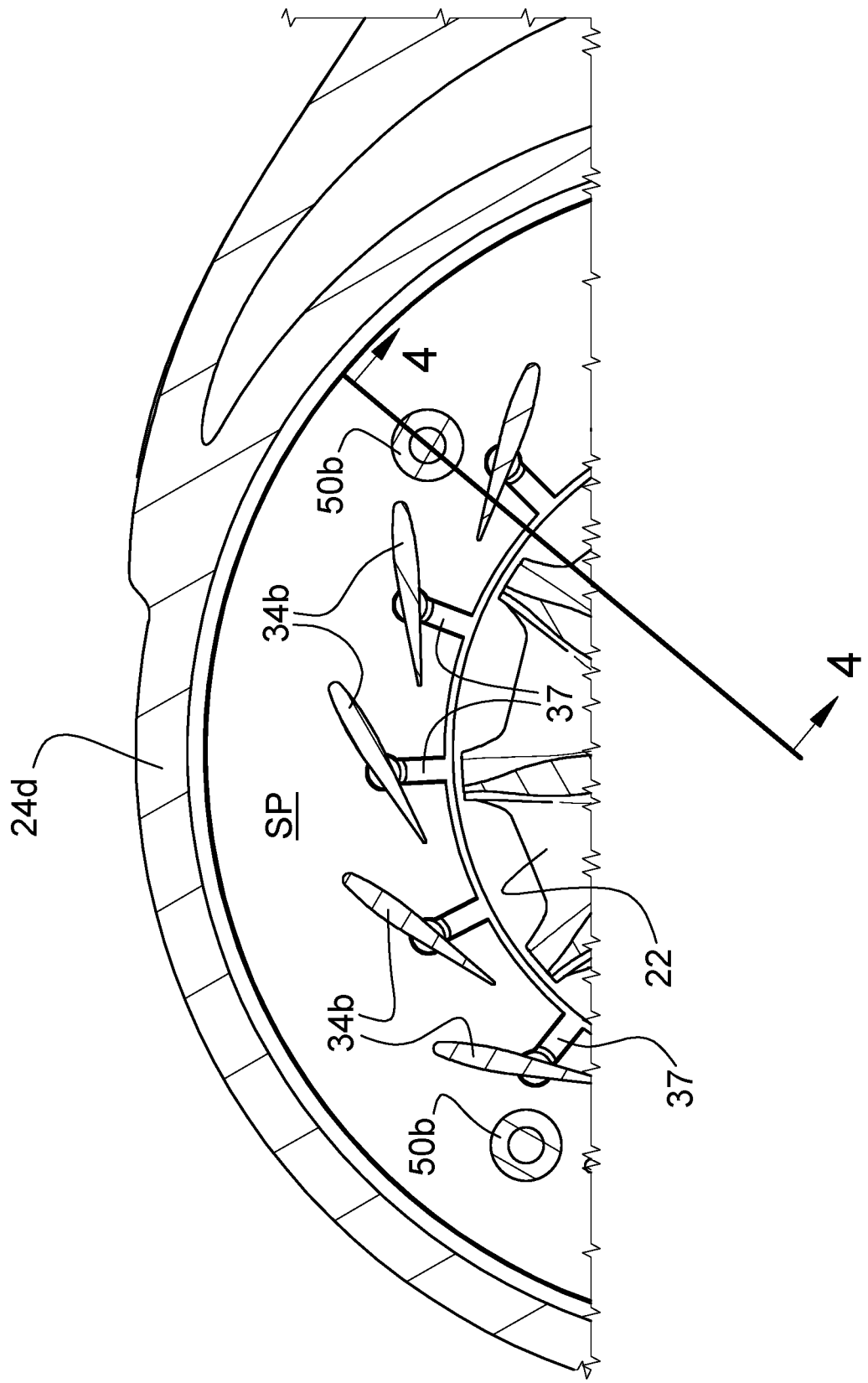
FIG. 3 is a sectioned view along line 3-3 in FIG. 2.
Figure 7:
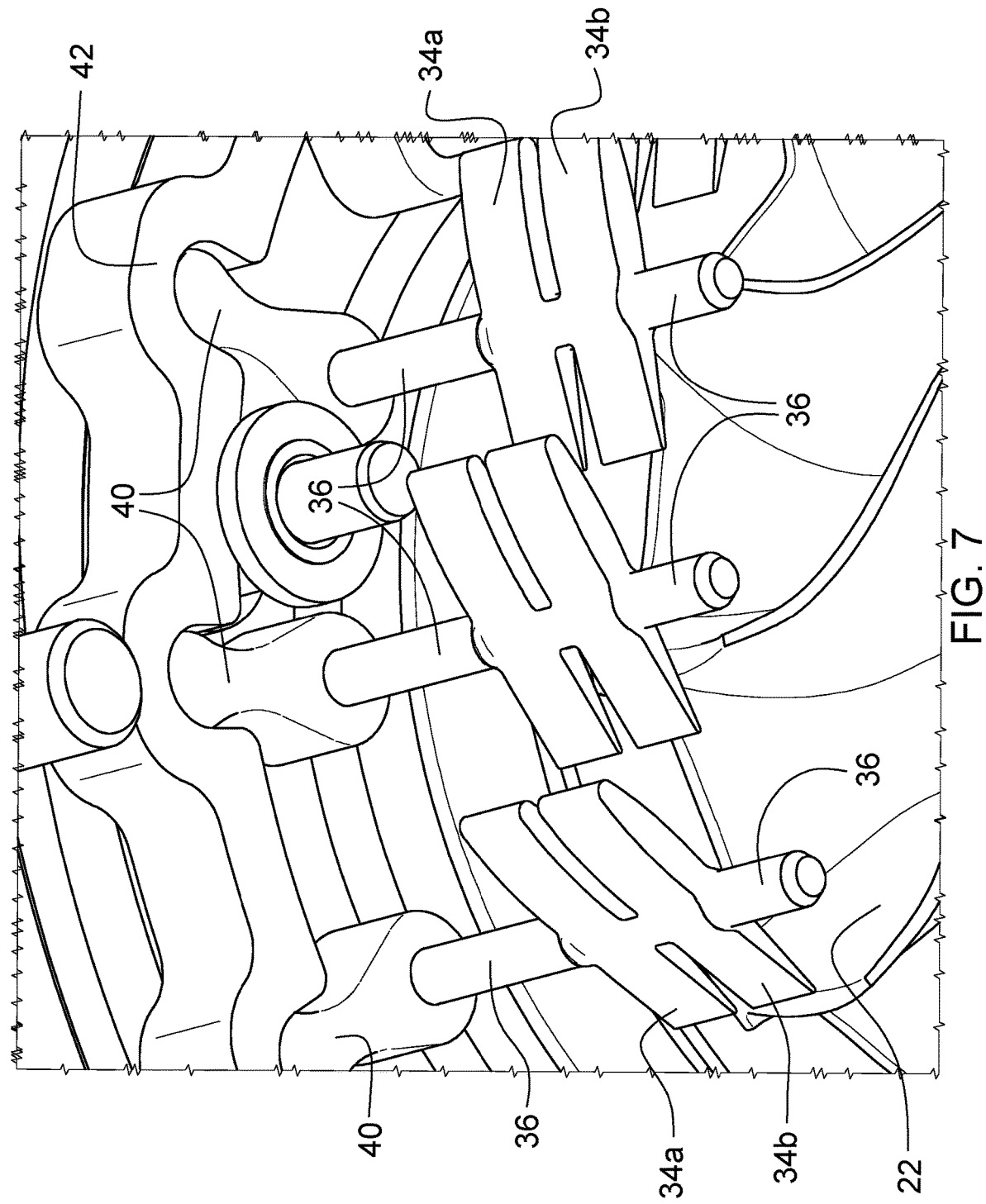
FIG. 7 is an isometric view of the variable nozzle with the nozzle ring, the annular insert, and the shroud plate removed in order to show details of the variable nozzle.

In the illustrated embodiment, the openings in the shroud plate for the vane shafts 36 comprise slots 37 that extend all the way to the radially inner periphery of the shroud plate SP, as shown in FIG. 3. Advantageously, each vane shaft 36 and its associated first vane 34a and second vane 34b comprise an integral one-piece construction, and the axial spacing between the first and second vanes is slightly greater than the thickness of the shroud plate. Referring to FIGS. 3 and 4, the slots 37 then facilitate assembly of the variable nozzle by allowing the portions of the vane shafts 36 between the first and second vanes to be inserted into the open ends of the slots 37 and to be slid radially outwardly to the closed ends of the slots, with the first and second vanes 34a,b disposed on opposite sides of the shroud plate. The pins 52 for the first spacers 50a are inserted through the pin-receiving openings in the shroud plate and the second spacers 50b are sleeved over the pins. The first portions of the vane shafts 36 can then be inserted into the bearing holes 39 in the nozzle ring 38 (FIG. 2), and the spacer pins 52 can be inserted into the first receiving holes 53 in the nozzle ring (FIG. 4). The second portions of the vane shafts 36 can be inserted into the blind shaft receptacles 44 in the insert 24i, while simultaneously inserting the spacer pins 52 through the second receiving holes 54 in the insert 24i. This partial assembly can then be assembled with the turbine housing 24 by installing the insert 24i into the recess 24r in the turbine housing, ensuring that the ends of the spacer pins 52 projecting from the opposite side of the insert 24i fit into the blind holes 56 in the turbine housing 24 (FIG. 4). The ends of the vane shafts 36 that protrude from the opposite side of the nozzle ring 38 can then be affixed to the vane arms 40 (FIG. 7), and the unison ring 42 can be engaged with the vane arms to complete the assembly of the variable nozzle.

Persons skilled in the art, on the basis of the present disclosure, will recognize that modifications and other embodiments of the inventions described herein can be made without departing from the inventive concepts described herein. For example, while the illustrated embodiment has first and second nozzles 28a and 28b of equal axial width, alternatively the two nozzles can have different widths. Additionally or alternatively, while the first vanes 34a are illustrated as having identical configurations as the second vanes 34b, instead the first vanes can be different in configuration from the second vanes, such as having different airfoil shapes and/or different setting angles. Other variations are also possible in the practice of the invention. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger having a meridionally divided variable-nozzle turbine, comprising:
    a turbine comprising a turbine housing and a turbine wheel mounted in the turbine housing and connected to a rotatable shaft for rotation therewith, the turbine housing defining a meridionally divided scroll extending circumferentially and surrounding the turbine wheel, the meridionally divided scroll defining a first scroll extending substantially fully about the turbine wheel and a separate second scroll extending substantially fully about the turbine wheel;
    the turbine housing defining a separate inlet for each of the first and second scrolls through which separate first and second exhaust gas streams are received;
    a nozzle leading from the meridionally divided scroll generally radially inwardly to the turbine wheel;
    a compressor comprising a compressor housing and a compressor wheel mounted in the compressor housing and connected to the rotatable shaft for rotation therewith;
    a center housing connected between the compressor housing and the turbine housing and containing bearings for the shaft;
    a generally annular nozzle ring having a first face that comprises one wall of the nozzle and that is axially spaced from an opposite wall of the nozzle;
    a shroud plate mounted within the nozzle, the shroud plate meridionally dividing the nozzle into a first nozzle and a second nozzle, the first nozzle receiving the first exhaust gas stream from the first scroll, the second nozzle receiving the second exhaust gas stream from the second scroll; and
    a plurality of circumferentially spaced first vanes disposed in the first nozzle and a plurality of circumferentially spaced second vanes disposed in the second nozzle, the first and second vanes being rotatably mounted to the nozzle ring so as to be variable in setting angle for regulating exhaust gas flow to the turbine wheel.

2. The turbocharger of claim 1, wherein the meridionally divided scroll of the turbine housing defines a divider wall that provides separation between the first exhaust gas stream in the first scroll from the second exhaust gas stream in the second scroll, and wherein a radially innermost edge of the divider wall is proximate a radially outer edge of the shroud plate, such that the shroud plate continues the separation between the first and second exhaust gas streams through the nozzle.

3. The turbocharger of claim 1, wherein the nozzle ring defines a plurality of circumferentially spaced bearing holes, and further comprising a plurality of vane shafts respectively disposed in the bearing holes and rotatable within the bearing holes about respective axes of the vane shafts, each of the vane shafts having a first shaft portion affixed to one of the first vanes in the first nozzle and having a second shaft portion extending through an opening in the shroud plate and affixed to one of the second vanes in the second nozzle, such that rotation of the vane shafts about the respective axes thereof causes the first vanes to pivot within the first nozzle and causes the second vanes to pivot within the second nozzle.

4. The turbocharger of claim 3, wherein the second shaft portions of the vane shafts project axially beyond the second vanes and extend into blind shaft receptacles defined in the opposite wall of the nozzle.

5. The turbocharger of claim 4, wherein the blind shaft receptacles are defined in an annular insert that is formed separately from the turbine housing and is disposed in an annular recess defined in the turbine housing.

6. The turbocharger of claim 1, further comprising a plurality of first spacers disposed between the nozzle ring and the shroud plate to govern a first axial spacing between the first face of the nozzle ring and the shroud plate, and a plurality of second spacers disposed between the shroud plate and the opposite wall of the nozzle to govern a second axial spacing between the shroud plate and the opposite wall of the nozzle.

7. The turbocharger of claim 6, wherein each of the first spacers includes a pin of smaller diameter than the first spacer, the pin having a first portion that projects axially from one side of the first spacer toward the nozzle ring, and wherein the nozzle ring defines a plurality of first receiving holes that respectively receive the first portions of the pins of the first spacers.

8. The turbocharger of claim 7, wherein each pin also includes a second portion that projects axially from an opposite side of the first spacer toward the opposite wall of the nozzle, the second portions of the pins passing through pin-receiving holes in the shroud plate, and wherein the opposite wall of the nozzle defines a plurality of second receiving holes that respectively receive ends of the second portions of the pins of the first spacers.

9. The turbocharger of claim 8, wherein the second spacers comprise sleeves of greater diameter than the pins of the first spacers, each of the sleeves defining a central bore through which a respective one of the pins of the first spacers passes.

10. The turbocharger of claim 8, wherein the opposite wall of the nozzle is defined by an annular insert and the turbine housing defines an annular recess in which the annular insert is disposed, and wherein the annular insert defines the second receiving holes for the pins.

11. The turbocharger of claim 10, wherein the second receiving holes pass entirely through an axial thickness of the annular insert and wherein the turbine housing defines a plurality of blind holes that align with the second receiving holes and that receive terminal ends of the second portions of the pins.

\* \* \* \* \*